Jan. 2, 1940.　　　　S. M. YOUNG　　　　2,185,454
HITCH
Filed Feb. 11, 1938　　　　2 Sheets-Sheet 1

Inventor
Stephen M. Young
By V. F. Lamagne
Atty.

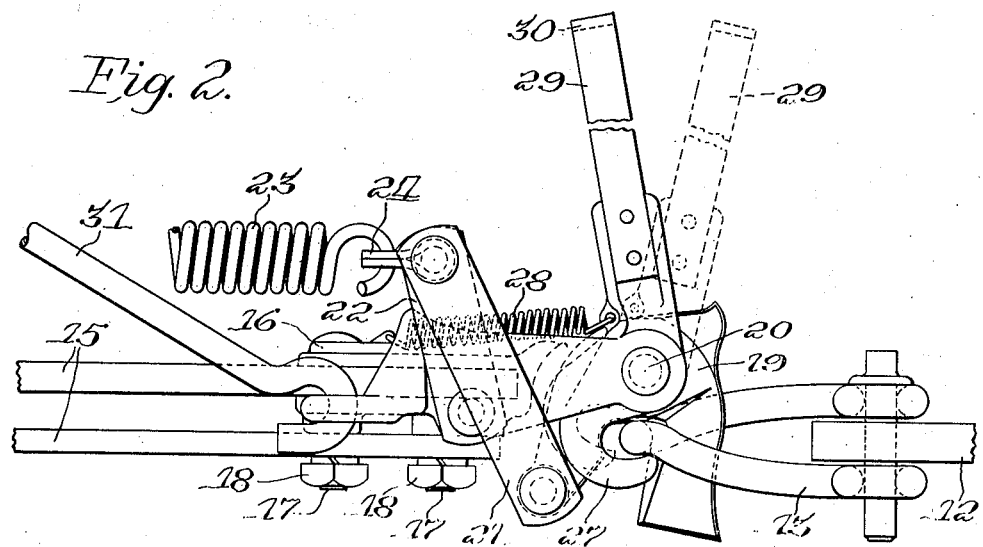
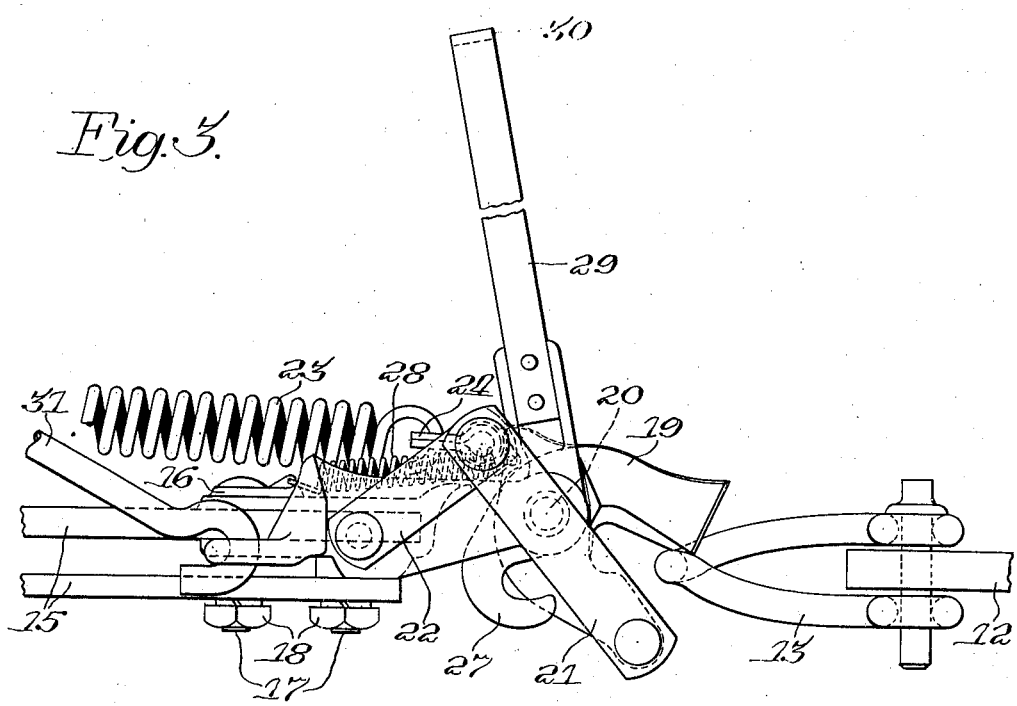

Patented Jan. 2, 1940

2,185,454

UNITED STATES PATENT OFFICE 2,185,454

HITCH

Stephen M. Young, Hamilton, Ontario, Canada, assignor, by mesne assignments, to International Harvester Company, Chicago, Ill., a corporation of New Jersey Application February 11, 1938, Serial No. 189,926

3 Claims. (Cl. 280—33.16)

This invention relates to a hitch for connecting an implement to a tractor. More specifically it relates to a hitch releasable at a predetermined pull of the tractor on the implement with means for reconnecting the implement to the tractor.

It is often desirable that a hitch between a tractor and an implement be releasable in the event that the implement strikes an obstruction in the ground. Such a releasable hitch may comprise a draft hook pivoted to the forward end of the draft member of the implement and controllable by a toggle mechanism, releasable at a predetermined load. After the implement has been disconnected from the tractor, it is necessary to provide a means for reconnecting the implement on the tractor.

The primary object of the invention is, therefore, to provide a means associated with the releasable hitch between a tractor and an implement for connecting the implement and the tractor.

A further object of the invention is the provision of a means within easy reach of an operator on the tractor for connecting an implement to the tractor.

Another object of the invention is to provide a device by means of which the draft member of an implement may be brought into engagement with the draft connection of a tractor.

Other objects will appear from the disclosure.

According to the present invention, a releasable draft hook is pivoted to the forward end of the draft member of an implement and is controlled by means of a toggle mechanism. A retaining hook is also pivoted to the draft member of the implement at the same point as the draft hook and in such a way that the two hooks normally enclose a space in which the draft clevis of the tractor is retained. If the implement is released from the tractor, the tractor and implement are brought into position to be reconnected, and the retaining hook is swung about its pivot point by means of a lever within reach of the operator of the tractor seat so that the draft hook may be brought down over the draft clevis of the tractor.

In the drawings:

Figure 3 shows the same parts in side elevation with the draft hook releasing the draft connection of the tractor; and, Figure 4 shows a plan view of the details of the hitch.

Figure 1:
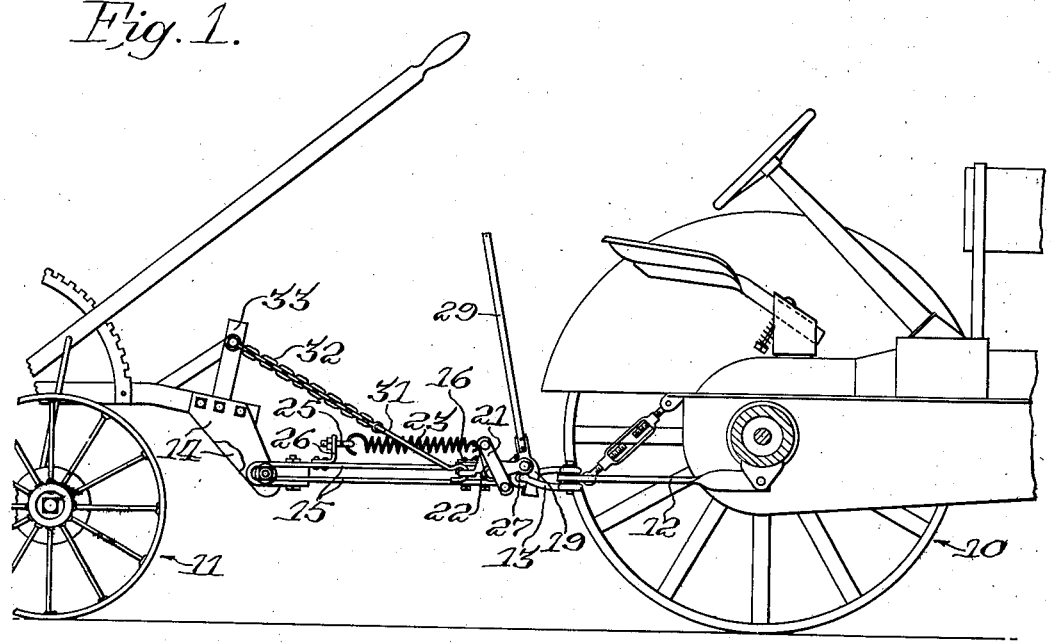
Figure 1 shows a side elevation of the novel hitch with portions of the implement and tractor also shown.

As seen in Figure 1, a tractor 10, only the rear portion being shown, is connected to an implement 11, only the front portion of which is shown. Extending from below the rear axle of the tractor is a draft applying means comprising a U bar 12 and draft clevis 13 having its ends connected to the center of the U bar 12. A pair of bracket members 14 are fixedly attached to the forward end of the implement and extend downwardly. A pair of spaced parallel draft members 15 are pivotally attached to the bracket members 14 and support at their forward ends a toggle head 16 rigidly attached thereto by means of bolts 17 and nuts 18. A draft hook 19 is pivotally attached adjacent the forward end of the toggle head at 20. A pair of long toggle members 21 is connected at one end to the draft hook and at its other end to a pair of short toggle members 22, which is in turn pivotally connected to the toggle head adjacent the ends of the draft member 15. A spring 23 is connected at one end to the point of connection of the toggle members 21 and 22 by means of a clip 24. The other end of the spring is held fixed with respect to the draft members 15 by means of an I-bolt 25 attached to an angle member 26 fixed to the upper draft member 15. The draft hook 19 engages the draft clevis 13 carried by the U member 12 of the tractor. In operation, the clevis 13 exerts pull on the draft hook 19 and tends to rotate it about its pivot point 20 but this rotation is resisted by the toggle members 21 and 22 and the spring 23. When, however, the pull between the member 13 and the hook 19 reaches a certain point, as is the case when the implement strikes an obstruction, the hook 19 will be pulled around into the position shown in Figure 3 with the toggle mechanism released, and the hook and U-shaped member will become disengaged.

It now becomes necessary to reconnect the tractor and the implement, and the means for accomplishing this will now be described.

Figure 2:
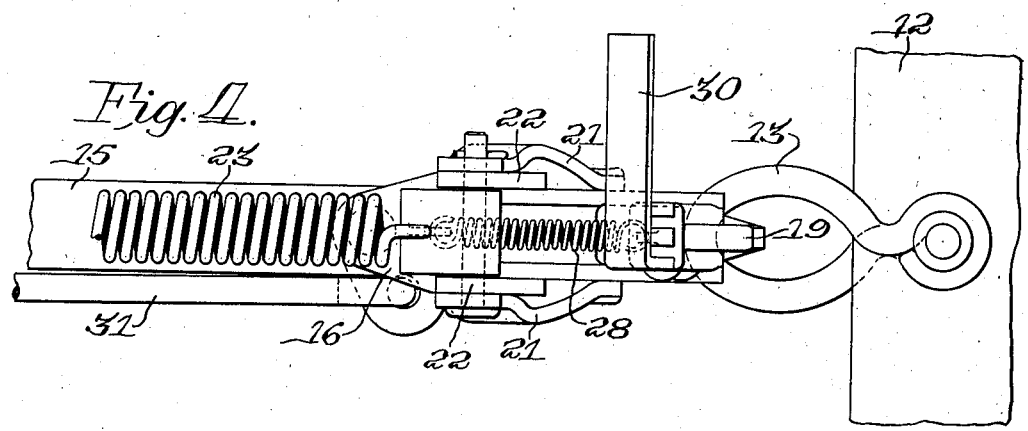
Figure 2 shows in side elevation the details of the hitch.

A retaining hook 27 is pivotally mounted on the toggle head 16 at the pivot point 20 of the draft hook and is so arranged that with the draft hook, it encloses the space normally occupied by the draft clevis 13. Such a position is shown in full lines in Figure 2. A spring 28, connected at its ends to the retaining hook 27 and the toggle head 16, tends to hold the retaining hook in this position. A pick-up lever 29 is fixed to the retaining hook and extends upwardly within easy reach of the operator's station on the tractor and has a bent end 30 to be grasped by the operator. After the implement has become disconnected from the tractor and is ready to be connected again, the tractor is brought into such a position that the draft clevis 13 is immediately adjacent the draft hook 19. Then, the operator from a position on the tractor seat grasps the end of the lever 29 and moves it forwardly from the full line position of Figure 2 to the dotted line position of the same figure. This allows access to the draft hook from beneath. By means of the lever, the operator raises the forward end of the draft members 15, the toggle head 16 and the draft hook 19 and then lowers them so that the draft hook again engages the U-shaped member 13. Finally, release of the lever by the operator allows it and the retaining hook to move back to the full line position in Figure 2, where the draft clevis 13 is enclosed.

As previously stated, the draft members 15 along with the toggle head and draft hook swing about the bracket members 14. The lowermost position, however, is limited by a flexible means comprising a rod 31 having a hooked end engaging the toggle head, a chain 32 connecting the other end of the rod 31, and an upstanding member 33 attached to the implement adjacent the bracket members 14.

It will be seen from the foregoing description that a means has been provided in connection with a releasable hitch by means of which the releasable hitch may be reconnected with the draft applying means of the tractor. The means not only insures against an accidental disconnection of the implement, but also permits an easy reconnection of the tractor and the implement by the operator from his seat on the tractor.

It will be apparent that the hitch may be applied for connecting other devices than a tractor and an implement. The intention is to limit the invention only within the terms of the appended claims.

What is claimed is:

1. An implement hitch comprising a draft member attached to the implement, a toggle head rigidly attached to the draft member at a region spaced from the implement, a draft hook pivotally attached to the toggle head at a point spaced from the region of attachment of the toggle head and draft member, a long toggle member pivotally attached at one end to the draft hook at a point spaced from its point of attachment of the draft hook and toggle head, a short toggle member pivotally attached at one end to the opposite end of the long toggle member and at the other end to the toggle head adjacent the point of attachment of the toggle head and the draft member, a retaining hook pivotally attached to the toggle head at the same point as the draft hook, and a pick-up lever rigidly attached to the retaining hook.

2. A hitch comprising a draft means having a releasable hook portion, a retaining hook pivotally mounted on the draft means and yieldingly held in a fixed position with respect to the draft means, the retaining hook and the hook portion of the draft means being normally positioned so as to enclose a space for retention of a draft-applying means, and a pick-up lever attached to the retaining hook and extending upwardly therefrom for lifting the draft means and swinging the retaining hook with respect to the draft means.

3. The combination with a draft means having a hook portion thereon, of a retaining hook pivotally mounted on the draft means adjacent the hook portion and yieldingly held in fixed position with respect to the draft means, and a pick-up lever attached directly to the retaining hook and extending upwardly therefrom for lifting the draft means and swinging the retaining hook with respect to the draft means.

STEPHEN M. YOUNG.